United States Patent [19]

Wright

[11] Patent Number: 4,765,580

[45] Date of Patent: Aug. 23, 1988

[54] LOUDSPEAKER SUPPORT

[76] Inventor: Richard M. Wright, 870 Aurora Ave., St. Paul, Minn. 55104

[21] Appl. No.: 64,504

[22] Filed: Jun. 22, 1987

[51] Int. Cl.$^4$ .............................................. F16M 11/14
[52] U.S. Cl. .................................. 248/181; 248/127; 248/176; 248/676; 381/205
[58] Field of Search ............... 248/181, 177, 157, 424, 248/163.2, 510, 676, 678, 176, 127; 312/7.1; 381/205

[56] References Cited

U.S. PATENT DOCUMENTS

| | | | |
|---|---|---|---|
| 227,492 | 5/1880 | Crandall | 248/441.1 |
| 1,559,716 | 11/1925 | Lingle et al. | 248/163.1 |
| 2,550,550 | 4/1951 | Goodstein | 248/448 |
| 2,752,116 | 6/1956 | Minnis | 248/181 |
| 4,214,724 | 7/1980 | Geiger | 248/181 X |
| 4,339,104 | 7/1982 | Weidman | 248/407 |
| 4,492,354 | 1/1985 | Rice | 248/163.1 |
| 4,643,386 | 2/1987 | Chastine | 248/678 X |

Primary Examiner—Ramon O. Ramirez
Attorney, Agent, or Firm—James V. Harmon

[57] ABSTRACT

The present invention provides a loudspeaker stand having a cup-shaped pedestal that may be perforated to provide an openwork below the loudspeaker to allow sound to be transmitted freely from the bottom wall of the loudspeaker, a tripod to support the pedestal and a brace assembly connected to the pedestal which includes a supporting post and tubes which extend vertically behind the back wall of the speaker to support a hub above the loudspeaker with arms projecting radially from the hub. Each arm has a corner socket connected to its free end to engage an upper corner of the loudspeaker to thereby brace the loudspeaker securely in place upon the pedestal.

8 Claims, 2 Drawing Sheets

LOUDSPEAKER SUPPORT

The present invention relates to loudspeakers and more particularly to a stand for a loudspeaker which will enable the sound from the loudspeaker to be projected from all surfaces of the loudspeaker, including the bottom.

It is well known that the acoustical qualities of a loudspeaker can be influenced by the surroundings and the acoustics of the room in which the loudspeaker is located. I have found that the sound quality is also influenced by the surface on which the speaker rests. For example, I have found that if the speaker is placed on the floor or other hard surface, optimum results cannot be achieved.

To overcome these and other deficiencies of the prior art the present invention has as an objective the provision of a means for supporting the loudspeaker away from the floor in such a manner that the sound qualities of the loudspeaker are enhanced. A more specific objective is to provide a loudspeaker support which is rugged in construction, reliable in operation, low in cost and enhances the sound qualities of the loudspeaker. A further objective is to provide a loudspeaker stand which is light in weight, strong, practical, maneuverable and can be used to enhance the sound qualities of loudspeakers of various sizes. It is a further objective to provide improved sound quality through greater fullness and clarity of sound and to avoid the loss of sound to the floor or the muffling effect of a hard surface adjacent to the loudspeakers. The invention will now be described by way of example with reference to the figures.

THE FIGURES

DESCRIPTION OF A PREFERRED EMBODIMENT

Figure 2:
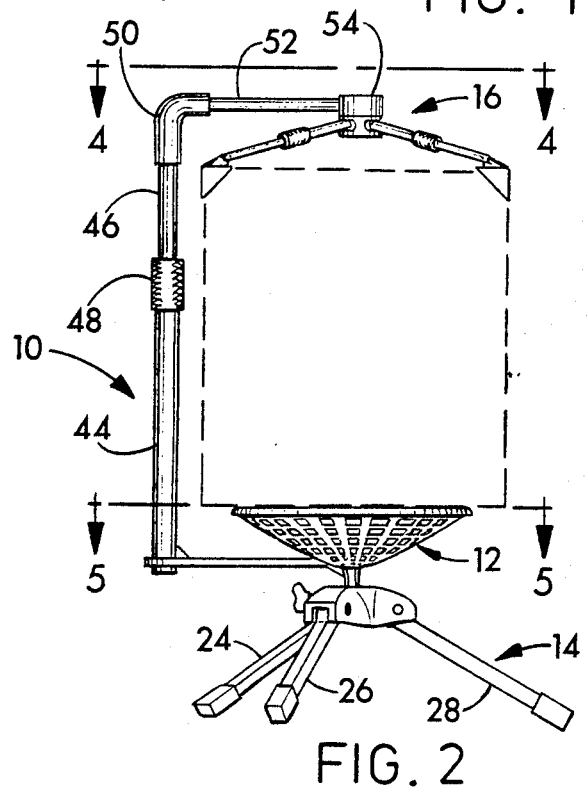
FIG. 2 is a side elevational view of the invention on a slightly reduced scale.
Figure 5:
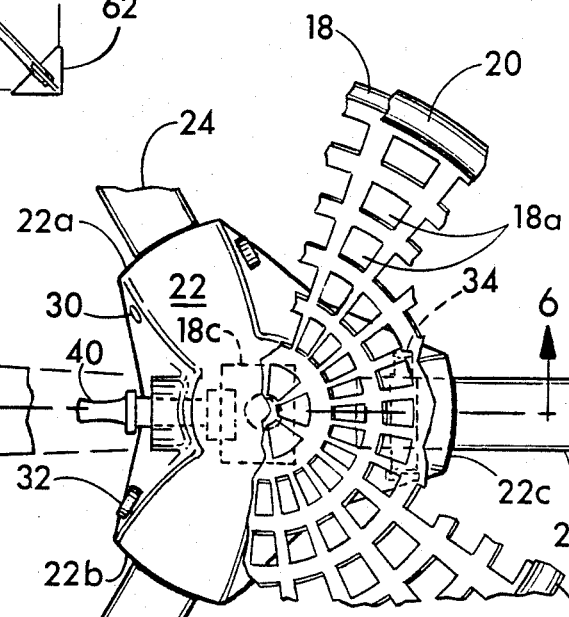
FIG. 5 is a partial transverse sectional view taken on line 5—5 of FIG. 2.

As shown in FIG. 2, a loudspeaker stand indicated generally at 10 is employed for supporting the loudspeaker several inches off the floor, in this case about 10 inches above the floor. The stand 10 includes a cup-shaped supporting pedestal composed of sheet material 18 molded or pressed into a downwardly curved, upwardly opening cup shaped form having a multiplicity of openings 18a and being circular as seen from above (FIG. 5) with a circular rubber cushion or lip 20 which extends around the entire periphery of the pedestal 12 along its upper free edge. It should be noted that the circular cushion defining the upper edge of the pedestal 12 lies in a flat plane (FIG. 6) so that it will conform to the flat bottom wall of the loudspeaker. The pedestal 12 need not be cup shaped but the cup-shaped form with openings 18a is a convenient means of supporting the loudspeaker without interfering with the sound transmission from its bottom wall. In this way the sound from all surfaces of the loudspeaker, including the bottom wall, will be transmitted freely into the surrounding air, thereby increasing the efficiency of the loudspeaker and reducing the muffling or sound deadening effect caused by contact between the bottom wall of the loudspeaker and a solid surface such as the floor.

The pedestal 12 is supported by means of a tripod 14 which includes a central bracket 22 from which three legs 24, 26 and 28 are secured by means of pivots 34 (FIGS. 5 and 6) to facilitate compact storage.

Figure 6:
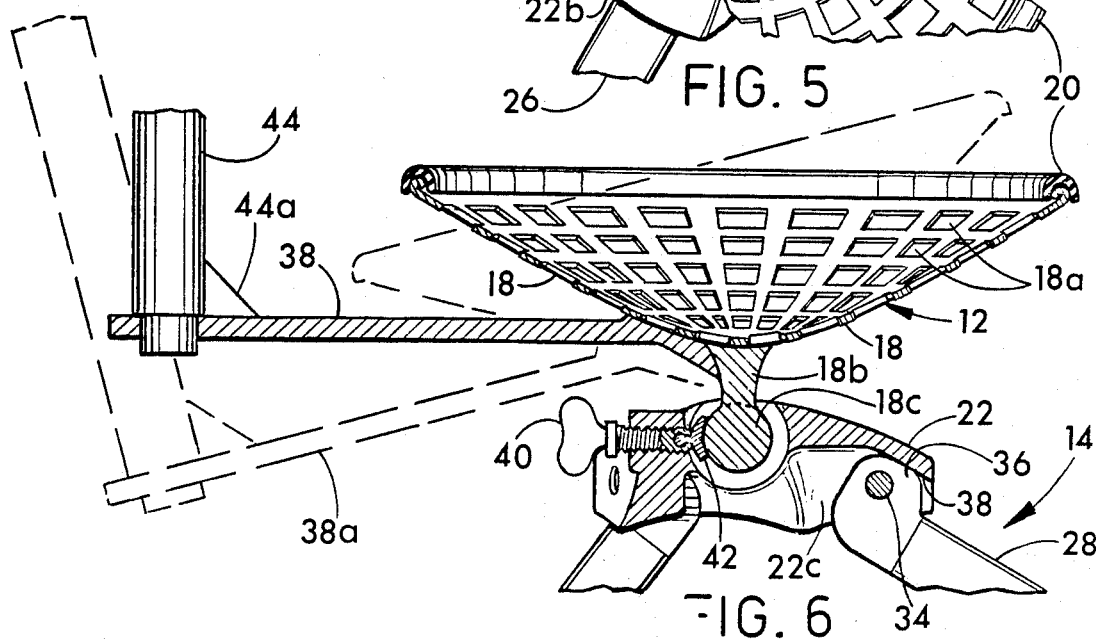
FIG. 6 is a vertical sectional view taken on line 6—6 of FIG. 5.

The pedestal 12 is provided with downwardly extending support posts 18b to which is secured a laterally extending cylindrical shaft 18c that is mounted for pivotal movement in a transversely extending bearing in the bracket 22 which allows the support post 18b as well as the pedestal 12 to pivot forwardly or rearwardly as shown by dotted lines in FIG. 6 about the center of the shaft 18c. This enables the loudspeaker to be pivoted to the desired angle so that the sound can be projected from the loudspeaker upwardly or downwardly at an inclined angle. To hold the shaft 18c in the desired position a thumbscrew 40 is screw-threaded through the bracket 22 and is provided at its inner end with a cylindrical shoe 42 which contacts the shaft 18c to hold the shaft 18c and the pedestal 12 at the desired angle, typically at a maximum of, say, about 30 degrees to the horizontal as shown by the dotted lines 38a in FIG. 6.

The loudspeaker can be held on the pedestal different ways but it is preferred to provide a rearwardly extending support arm 38 connected at one end to the pedestal and having a vertically disposed post 44 at its rearward end to which an internal telescoping tube 46 is held in the desired location by means of an internally threaded collar 48 that serves to tighten the upper end of the post 44 which is hollow onto the lower end of the tube 46 to hold it in the location desired so that a bracing assembly 16 will be at the proper elevation to engage the top of the speaker.

Figure 1:
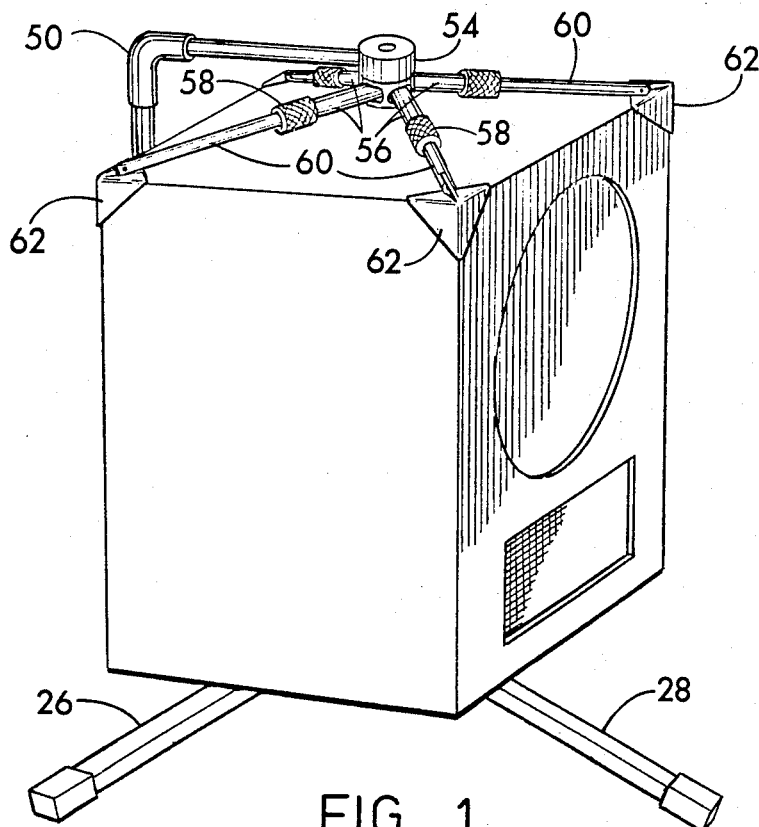
FIG. 1 is a perspective view of the invention as it appears when supporting a loudspeaker.
Figure 3:
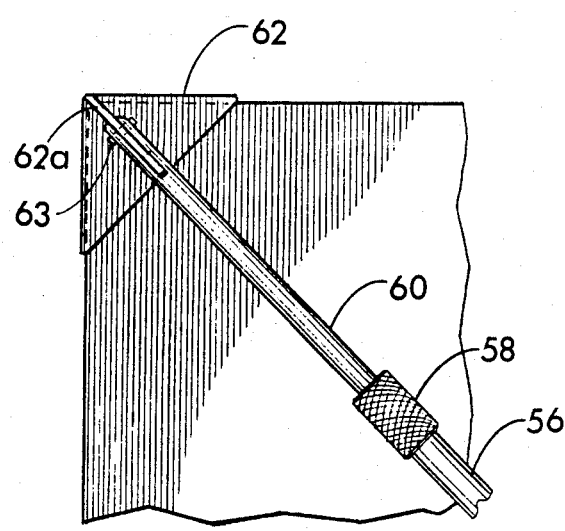
FIG. 3 is a partial top view on an enlarged scale.
Figure 4:
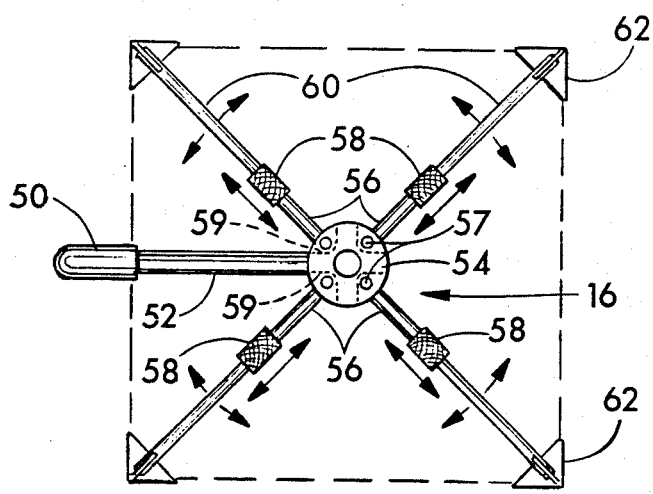
FIG. 4 is a top view of the invention taken on line 4—4 of FIG. 2.

At the upper end of the tube 46 is an elbow 50 connected to a horizontally extending supporting tube 52 to the free end of which is connected a hub 54 having 4 diverging arms 56 pivoted thereto by means of vertically disposed pivots 57. Enlarged openings 59 are provided in the sides of the hub 54 to receive the inner ends of the arms 56 to provide adequate space for lateral pivotal movement. The arms 56 are telescopically connected to extensions 60 having cup-shaped corner sockets 62 secured to their free ends. As shown in FIGS. 1 and 3 the sockets 62 are shaped like the corner of a rectangular solid to accommodate the corners of the loudspeaker and each is provided with an upwardly extending flange 62a to which the extension 60 is connected by means of a pivot 63 to facilitate limited pivotal movement of the socket 62 on the extensions 60 of the arms 56. The telescoping extensions 60 are held securely in place by means of internally threaded collars 58 which when turned will cause the adjacent portion of the arms 56 to tighten onto the extensions 60 thereby holding them securely in place.

While the stand can be made from any convenient materials, it is preferred that the brace assembly 16 and tubular elements, as well as the legs 24–28, be made from a lightweight metal such as aluminum. The corner sockets 62 and the pedestal 12 can be made from plastic resin and the cushion 20 can be made from sponge rubber.

While not essential, it is preferred that the bottom half of the hub 54 be pivoted to the top half by means of a vertically disposed upwardly extending pivot pin thereby allowing the arms 56 to be pivoted as a unit about a vertical axis. In this way the sockets 62 can be more quickly placed in position around the corners of the loudspeaker.

Many of the variations of the invention within the scope of the apended claims will be apparent to those skilled in the art once the principles described above are understood.

What is claimed is:

1. A loudspeaker stand and loudspeaker comprising in combination, a pedestal adapted to engage the bottom of the loudspeaker to hold the loudspeaker above the floor or other support surface, said loudspeaker being mounted on the pedestal, legs extending downwardly from the pedestal, said pedestal comprising an openwork to permit the free transmission of sound downwardly from the loudspeaker bottom wall supported upon the pedestal and a brace assembly connected to the pedestal and being constructed and arranged to be placed in contact with a portion of the loudspeaker and to securely engage the loudspeaker so as to thereby hold the loudspeaker in place on the pedestal, a releasable means for the brace assembly, said brace assembly being thereby releasable and engageable with the loudspeaker as required whereby the loudspeaker is securely held in place upon the stand.

2. The stand of claim 1 wherein the pedestal is formed from an openwork composed of sheet material having a supporting rim and a cushion is connected to said rim to engage the bottom wall of the loudspeaker and to provide resilient support for the loudspeaker.

3. A loudspeaker stand comprising a supporting bracket having legs depending therefrom, a pedestal pivotally supported on the bracket for pivotal movement about a horizontal axis, said pedestal being adapted to engage a lower surface of a loudspeaker and bracing means connected to the pedestal and being constructed and arranged to engage a portion of the loudspeaker above the pedestal and including means to releasably grip the loudspeaker to brace the loudspeaker and hold the loudspeaker securely in place on the pedestal so as to keep the loudspeaker from moving on the pedestal when the pedestal is pivoted about the horizontal axis, said pedestal being constructed to engage the bottom wall of a loudspeaker at spaced apart points and being constructed and arranged to permit the sound to be transmitted downwardly from portions of the bottom wall of a loudspeaker between said points whereby the pedestal is sufficiently open to permit the sound to be transmitted freely in all directions from the bottom wall of the loudspeaker, whereby the pedestal does not significantly obstruct sound transmission away from the loudspeaker.

4. The apparatus of claim 3 wherein the brace assembly comprises corner sockets to engage upper corner portions of said loudspeaker, arms connected to the sockets and a supporting means operatively connected between the arms and the pedestal to support the arms above the pedestal and above the loudspeaker.

5. The loudspeaker stand of claim 3 wherein the pedestal is pivotally connected to the bracket and a releaseable retaining means is provided to releaseably control the angular position of the pedestal on the bracket.

6. The apparatus of claim 3 wherein an arm extends rearwardly from the pedestal, a post extends upwardly from the rear end of the arm, and a brace assembly is connected to the top of the post, said brace assembly including a hub connected to the post and a plurality of radially extending arms projecting generally horizontally from the hub and each of the arms having a cup-shaped socket at its free end to engage an upper corner of said loudspeaker.

7. The stand of claim 6 wherein the radially extending arms include telescopic extensions and releaseable members for securing the extensions in place upon the arms to change the distance between the sockets and the hub.

8. A method of enhancing the sound quality and projection from a box style loudspeaker having a speaker housing with a top, bottom, and side walls and a loudspeaker sound unit mounted therein, said method comprising, supporting the speaker housing in spaced relationship above the floor upon a speaker stand resting on a horizontal support surface below the stand, maintaining the area beneath the speaker substantially free from sound obstructing bodies in contact with the bottom wall, permitting the bottom wall of the housing to vibrate without the sound deadening effect of a floor surface or other sound deadening object pressed thereagainst, gripping the loudspeaker on the stand to hold the loudspeaker in place thereon, articulating the speaker housing to point the loudspeaker sound unit in a desired direction that may be either along a horizontal axis or at a selected angle to the horizontal to project sound from the speaker unit in said desired direction and releasably securing the speaker housing in the position thus selected to maintain the direction of the sound projected from the loudspeaker unit while the speaker is being used and enhancing acoustic resonance of the speaker housing and the output of sound projected from the bottom wall of the housing.

* * * * *